US008175049B2

(12) United States Patent
Sternberg et al.

(10) Patent No.: US 8,175,049 B2
(45) Date of Patent: May 8, 2012

(54) METHOD AND APPARATUS FOR REFERENCE TRANSPORT CHANNEL SELECTION

(75) Inventors: Gregory S. Sternberg, Mount Laurel, NJ (US); Matthew G. Puzio, Collegeville, PA (US); William E. Lawton, Parker Ford, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 647 days.

(21) Appl. No.: 12/355,424

(22) Filed: Jan. 16, 2009

(65) Prior Publication Data

US 2009/0185530 A1 Jul. 23, 2009

Related U.S. Application Data

(60) Provisional application No. 61/021,703, filed on Jan. 17, 2008.

(51) Int. Cl.
*H04W 74/00* (2009.01)
(52) U.S. Cl. .................................. 370/329; 370/252
(58) Field of Classification Search .............. 370/252, 370/329, 332, 333, 335, 342
See application file for complete search history.

(56) References Cited

U.S. PATENT DOCUMENTS 6,473,442 B1 * 10/2002 Lundsjo et al. ........... 370/537
2004/0082301 A1 4/2004 Agin
2004/0116142 A1 * 6/2004 Wang et al. ............... 455/522
2004/0120288 A1 * 6/2004 Adjakple et al. ........... 370/333
2004/0203457 A1 10/2004 Rikola et al.
2005/0025112 A1 * 2/2005 Koo et al. ................. 370/342
2007/0218937 A1 * 9/2007 Koo et al. ................. 455/522

FOREIGN PATENT DOCUMENTS

EP 1 255 368 11/2002
WO 2004/032528 4/2004

OTHER PUBLICATIONS

Third Generation Partnership Project, "Technical Specification Group Radio Access Network; User Equipment (UE) Radio Transmission and Reception (FDD) (Release 6)", 3GPP TS 25.101 V6.15.0 (Sep. 2007).
Third Generation Partnership Project, "Technical Specification Group Radio Access Network; User Equipment (UE) Radio Transmission and Reception (FDD) (Release 6)", 3GPP TS 25.101 V6.18.0 (Sep. 2008).
Third Generation Partnership Project, "Technical Specification Group Radio Access Network; User Equipment (UE) Radio Transmission and Reception (FDD) (Release 7)", 3GPP TS 25.101 V7.10.0 (Dec. 2007).
Third Generation Partnership Project, "Technical Specification Group Radio Access Network; User Equipment (UE) Radio Transmission and Reception (FDD) (Release 7)", 3GPP TS 25.101 V7.14.0 (Dec. 2008).

(Continued)

*Primary Examiner* — Brian Nguyen
(74) *Attorney, Agent, or Firm* — Volpe and Koenig, P.C.

(57) ABSTRACT

A method and apparatus for reference transport channel (TrCH) selection includes tracking characteristics on each of a TrCH. Whether or not any TrCHs meet a predetermined criteria is determined. A reference TrCH is selected based upon the determination of TrCHs that meet the predetermined criteria.

20 Claims, 3 Drawing Sheets

OTHER PUBLICATIONS

Third Generation Partnership Project, "Technical Specification Group Radio Access Network; User Equipment (UE) Radio Transmission and Reception (FDD) (Release 8)", 3GPP TS 25.101 V.8.1.0 (Dec. 2007).

Third Generation Partnership Project, "Technical Specification Group Radio Access Network; User Equipment (UE) Radio Transmission and Reception (FDD) (Release 8)", 3GPP TS 25.101 V8.5.1 (Jan. 2009).

Third Generation Partnership Project, "Technical Specification Group Radio Access Network; User Equipment (UE) Radio Transmission and Reception (FDD) (Release 8)", 3GPP TS 25.101 V8.1.0 (Dec. 2007).

* cited by examiner

US 8,175,049 B2

METHOD AND APPARATUS FOR REFERENCE TRANSPORT CHANNEL SELECTION

CROSS REFERENCE TO RELATED APPLICATIONS

This application claims the benefit of U.S. Provisional Application No. 61/021,703, filed Jan. 17, 2008, which is incorporated by reference as if fully set forth.

FIELD OF INVENTION

This application is related to wireless communications.

BACKGROUND

In a wideband code division multiple access (WCDMA) wireless communication system, a desired quality of service (QoS) may be achieved and maintained by a dual-loop feedback algorithm that utilizes outer loop power control (OLPC) and inner loop power control (ILPC). In general, a transmitter sends wireless data to a receiver, where an OLPC algorithm measures and/or estimates the QoS metric such as a block error rate (BLER) or bit error rate (BER). The OLPC algorithm determines if the measured QoS is above or below its QoS target and lowers or raises the target signal to interference ratio (SIR) accordingly. The ILPC algorithm measures a short term SIR on the dedicated physical control channel (DPCCH) pilot signal and compares it to the target generated by the OLPC.

If the short term SIR is higher than the target SIR, a command to decrease the transmitted power is sent. Otherwise, a command to increase the transmitted power is sent. The transmitter then increases or decreases its transmit power in accordance with the command, if possible. When multiple QoS targets exist for different services mapped to the same dedicated physical channel (DPCH), such as voice and video, the process may be a bit more complicated since these QoS targets may need to be met simultaneously. Since the OLPC algorithm may be limited to a single target SIR, the most demanding QoS service is chosen as the reference service, since it has the highest required SIR.

One method for handling multiple QoS targets is to switch the reference transport channel (TrCH) via a TrCH switching algorithm. That is, the OLPC measures a long-term BLER or BER on all TrCHs and selects as the reference TrCH the TrCH that is failing to meet its QoS targets by the largest amount. The target SIR updates are generated by the OLPC based off that selected reference TrCH. Using the long-term BLER or BER measurement, the OLPC determines if a different TrCH requires a higher SIR to achieve its QoS target than the current reference TrCH and switched the reference TrCH accordingly.

An issue with the above method of switching the reference TrCH, however, is that a wait period of tens or hundreds of seconds may be needed for a reliable BLER or BER estimate to determine which TrCH should be the reference TrCH. This is because a statistically reliable BLER or BER estimate requires an observation interval long enough to capture a large enough number of error events. For example, to measure a BLER of 0.001 with 100 error events, 100,000, or 100/BLER, blocks must be observed. During this observation time, data that is not on the reference TrCH may experience a substantial deterioration in quality. Accordingly, it would be beneficial to provide a method and apparatus for reference TrCH selection that is not subject to the limitations of the current state of the art.

SUMMARY

A method and apparatus for reference transport channel (TrCH) selection is disclosed. The method includes tracking characteristics on each TrCH. Whether or not any TrCHs meet a predetermined criteria is determined. A reference TrCH is selected based upon the determination of TrCHs that meet the predetermined criteria.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
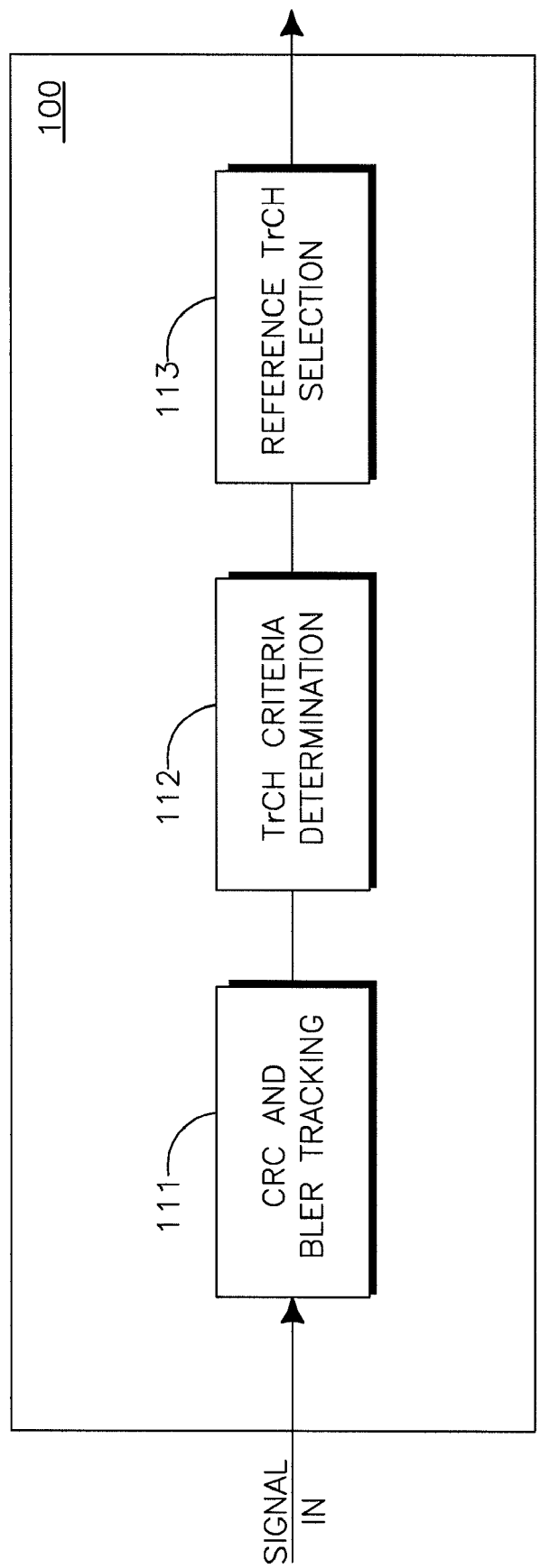
FIG. 1 is a functional block diagram of an apparatus for selecting a reference TrCH.

FIG. 1 is a functional block diagram of an apparatus for selecting a reference TrCH 100. The apparatus 100 may be a processor or any other type of device that could be utilized to perform a reference TrCH selection. Although a more detailed example method of performing a reference TrCH selection will be described below, in general, the apparatus 100 includes a cyclic redundancy check (CRC) and block error rate (BLER) tracking functional block 111, a TrCH criteria determination functional block 112, and a reference TrCH selection functional block 113. The apparatus 100 is capable of receiving a signal, and may receive it in the CRC and BLER tracking block 111.

Figure 2:
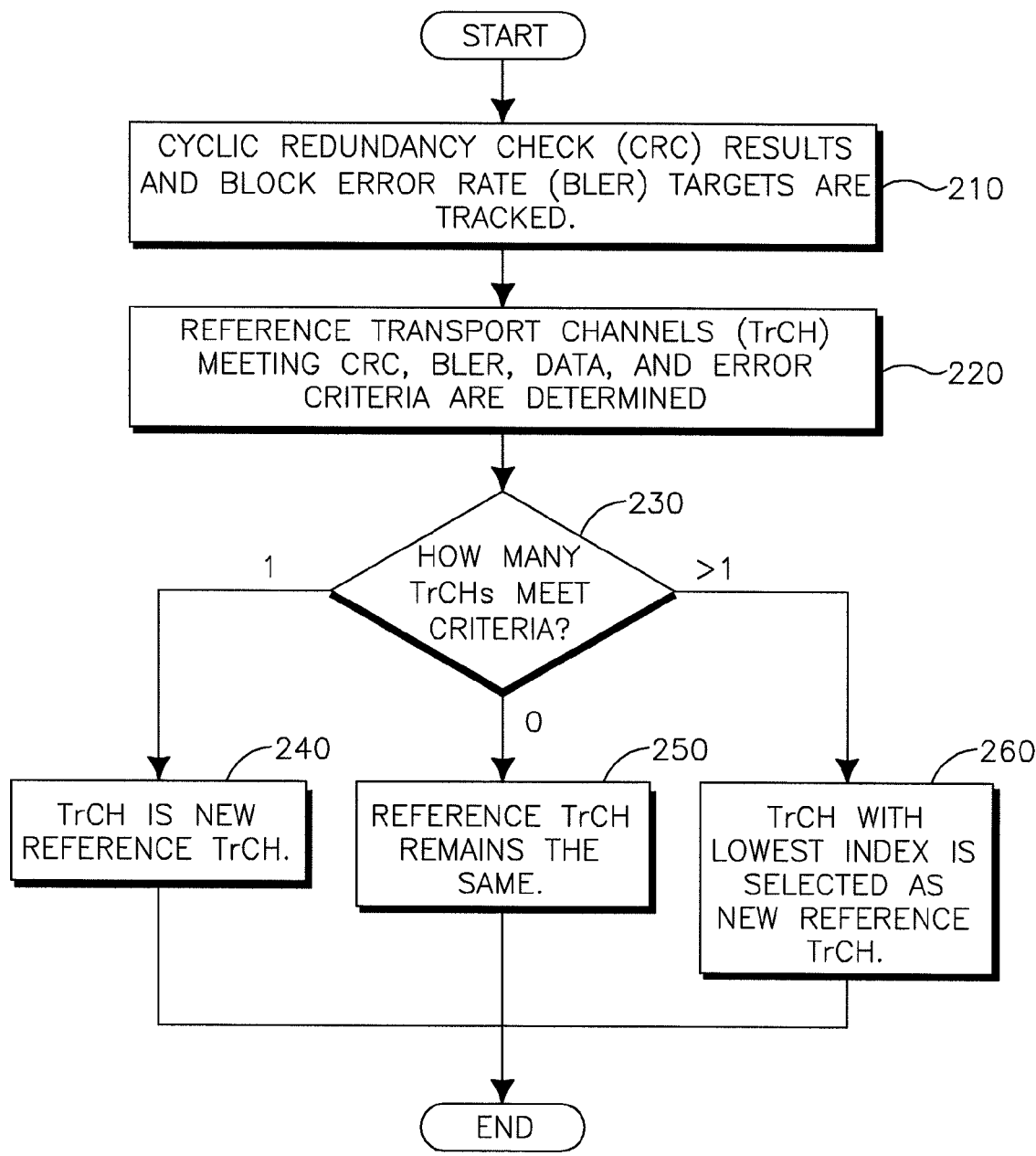
FIG. 2 is an example method for reference TrCH selection.

FIG. 2 is an example method 200 for reference TrCH selection. In general, the reference TrCH selection utilizes a number of signal characteristics. For example, OLPC may utilize CRC results and a target BLER to track. Accordingly, the OLPC algorithm may exclude any TrCH that does not have both a CRC result and a target BLER.

Accordingly, in step 210, CRC results and BLER targets are tracked. Since the OLPC algorithm utilizes CRC results to track, if the reference TrCH has not been transmitted in any TTI, the OLPC may freeze the target SIR. However, it may be the case where the TrCH needing the highest target SIR is in discontinuous transmission (DTX) frequently for short bursts. In this case, it may not be desirable for the OLPC to switch away from this TrCH as the reference. Accordingly, it may be desirable for the OLPC to count the number of consecutive frames that each TrCH is in DTX, where the TrCHs that have a duration longer than a DTX timeout value (dtx_ timeout), are given less preference than other TrCHs to be selected as the reference. In one example, dtx_timeout may be equal to two (2).

In addition, both good and bad CRC results may be utilized for tracking purposes. Therefore, if a TrCH has only infrequent CRC errors, it may not be an ideal reference TrCH. Since the OLPC algorithm counts the number of errors on each TrCH from the last reference TrCH change, TrCHs that have observed more than a minimum number of errors, min_errors, may be selected over those that have less. For example, min_errors may be ten (10). For example, a "good" CRC result may mean the data block passed the CRC check, (i.e., data has no errors). A "bad" CRC may mean the data block failed the CRC check, (i.e., data has errors). OLPC increases the target SIR when a "bad" CRC is decoded. That is, it requests more power to avoid errors. Conversely, OLPC decreases the target SIR when a "good" CRC is decoded. That is, it requests lower power. OLPC needs both "good" and "bad" CRC results to settle on a steady-state target SIR.

Another characteristic may be that the OLPC tracks a TrCH that just meets its target BLER. In this case, if one TrCH is meeting its target BLER but another is well above its target BLER, the OLPC may track the one that is well above its target BLER. The OLPC algorithm may estimate the BLER on each TrCH and select those that are exceeding their BLER by a predetermined percent, exceed_bler_perc, such as twenty-five percent (25%), with higher preference.

Fast tracking TrCHs may also be selected with higher preference. This is because higher target BLERs may includes larger step-down sizes, meaning the OLPC can track dynamic changes quickly and TrCHs with higher target BLERs may be selected with higher preference. In addition, long TTIs require a long time to converge and track. Accordingly, TrCHs with shorter lengths may be selected with higher preference.

After step 210, each frame the OLPC determines which TrCHs have a valid CRC, valid data received in the past time period (e.g., two seconds), a minimum number of errors (e.g., ten) received since the last reference TrCH change, and an estimated BLER above the target BLER (step 220). Since it may be possible that some, all, or no TrCHs meet the characteristics in step 220, it is then determined how many TrCHs meet the criteria (step 230).

If only one TrCH meets the criteria (step 230), then the TrCH that meets the criteria is the new reference TrCH (step 240). This is the case even if the only TrCH that meets the criteria in step 230 is the same TrCH as the original reference TrCH.

Alternatively, if no TrCHs meet the criteria in step 230, then the reference TrCH remains the same as the current reference TrCH (step 250). However, if no reference TrCHs meet the criteria in step 230 and the current reference has not received valid data in the past discontinuous transmission timeout (dtx_timeout), which may have a default value of two seconds, then the OLPC may switch to a reference TrCH that has recently received valid data. This may be performed because the OLPC may become locked on a TrCH as a reference TrCH with no data even if another TrCH has data. In this case, the OLPC may desire to select that TrCH with data, even if it is not the best reference TrCH candidate over the current TrCH which has no data. Also, in this case, the OLPC selects the TrCH having the best characteristic ranking, regardless of whether or not it meets all of the characteristics (criteria) in step 220.

If multiple TrCHs, (i.e., >1), meet the criteria in step 230, then it may indicate that there are several similar TrCHs and any of them may qualify as a valid reference TrCH. In this case, the OLPC may select the TrCH having the lowest TrCH index as the new reference TrCH (step 260), which may be an internally determined index. For example, the OLPC algorithm may choose the TrCH with the highest BLER target. If there are multiple TrCHs with the highest BLER target, it may choose the one of those with the shortest TTI length. If there are multiple TrCHs with the highest BLER target and the shortest TTI length, it may then choose the one with the lowest index. The index is unique per TrCH. Each BLER and TTI may be assigned by the network.

Since the determination of the reference TrCH depends on BLER estimates for each TrCH, the following characteristics may be desirable for the BLER estimation, or estimator:

Fast Convergence Time: if there is an extended period of time where there are no errors or all errors, the BLER estimator may converge to zero (0) or one (1), respectively, in a short amount of time.

Accuracy: if the errors are independent and identically distributed (IID), the BLER estimator may report an estimate close to the true BLER.

De-emphasize events that occur in the distant past: the BLER estimator may be "forgetful", (i.e., not heavily influenced by events in the distant past).

Two exponentially weighted moving average (EWMA) filters may be utilized as the BLER estimator. The BLER estimate (BLER_estimate) may then computed in accordance with the equations below, where Ne is the number of errors each TTI and Nb is the number of blocks each TTI, and 'α' is the bandwidth of the filter:

$$\text{Ne\_filtered}=\text{Ne}*\alpha+\text{Ne\_previous}*(1-\alpha); \quad \text{Equation (1)}$$

$$\text{Nb\_filtered}=\text{Nb}*\alpha+\text{Nb\_previous}*(1-\alpha); \text{ and}$$
$$\text{BLER\_estimate}=\text{Ne\_filtered}/\text{Nb\_filtered}. \quad \text{Equation (2)}$$

Figure 3:
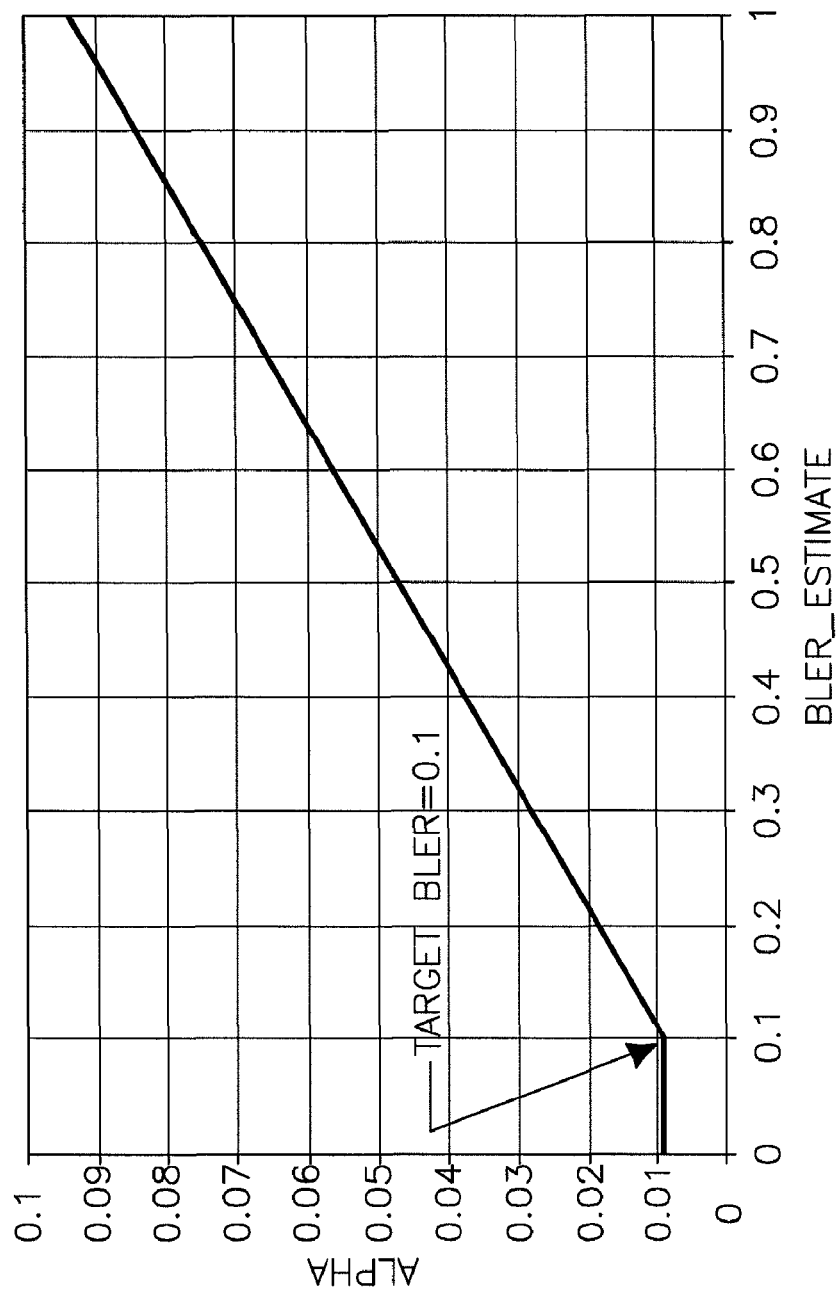
FIG. 3 shows an example graphical representation of a BLER estimate versus alpha.

After the BLER_estimate is calculated, Nb_previous is set to Nb_filtered and Ne_previous is set to Ne_filtered. Alpha (α) may vary based on the target BLER and previous values of BLER_estimate. As alpha gets smaller, the convergence speed of the BLER_estimate slows. Accordingly, to maintain an accurate estimate near the target BLER, alpha may be set to the minimum value when the BLER_estimate equals the target BLER divided by some constant (target_BLER_scale). FIG. 3 shows an example graphical representation 300 of a BLER estimate versus alpha with target_BLER_scale equal to 1. A target BLER is also shown in FIG. 3.

Two additional features of the BLER estimator may facilitate step down response, which is the speed at which the BLER_estimate resets to zero when there are no errors for a long time. In one example, when no errors are received for 5/BLER TTIs, alpha may be multiplied by a factor, (e.g., sixteen (16)). In this circumstance, the BLER estimate will converge toward zero quickly. For example, if alpha is increased by a large amount, (e.g., multiplied by 16), Equation (1) and Equation (2) become heavily weighted towards Ne & Nb. In other words, the filter memories (Ne_previous & Nb_previous) are de-emphasized. The BLER_estimate moves from Ne_filtered/Nb_filtered towards something closer to Ne/Nb. Since it may be assumed Ne=0 when no errors are received, the BLER_estimate will move towards 0/Nb=0.

The OLPC algorithm may also include an EWMA filter having a large bandwidth, (e.g., alpha=0.1), may be put on the target SIR update signal. In this manner, when the output of this filter exceeds a large positive threshold, (e.g., 0.1 dB), the target SIR may be considered to be unconverged and the BLER estimators may be reset, (i.e., Ne_previous=Nb_previous=0). This way, the BLER estimate may be able to forget a long burst of errors.

Because the method disclosed above quickly detects when a non-reference TrCH has a poor QoS relative to its QoS target and makes this TrCH the new reference TrCH, all TrCHs may meet their QoS targets significantly faster than in the current state of the art. Table 1 below shows an example simulation for the 25.101 Power control in the downlink, different transport formats conformance test using prior art and the current method.

TABLE 1

|  | Prior-Art Algorithm | Proposed Algorithm |
|---|---|---|
| Time to meet QoS target on both transport channels (seconds) | 200 | 6.5 |

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for reference transport channel (TrCH) selection, comprising:
    tracking by a cyclic redundancy check (CRC) and block error rate (BLER) tracking functional block characteristics on each of a plurality of TrCHs;
    determining by a TrCH criteria determination functional block whether or not any TrCHs meet a predetermined criteria, wherein the predetermined criteria include a valid data received within a predetermined time period or a minimum number of errors received since a last reference TrCH change; and
    selecting by a reference TrCH selection functional block a reference TrCH based upon the determination of TrCHs that meet the predetermined criteria.

2. The method of claim 1 wherein the characteristics tracked are cyclic redundancy check (CRC) results.

3. The method of claim 1 wherein the characteristics tracked are block error rates (BLERs).

4. The method of claim 1 wherein the predetermined criteria further includes any one of the following criteria: a valid CRC, an estimated block error rate (BLER) above a target BLER, a transmission time interval (TTI) length, the target BLER, or a TrCH index.

5. The method of claim 4 wherein if a plurality of TrCHs meet the predetermined criteria with equal metrics, a TrCH of the plurality having a lower index is selected as the reference TrCH.

6. The method of claim 4 wherein an estimated BLER converges to zero (0) when no errors are detected over a period of time.

7. The method of claim 4 wherein an estimated BLER converges to one (1) when only errors are detected over a period of time.

8. The method of claim 4 wherein the estimated BLER is not influenced by past errors or lack of errors.

9. The method of claim 4 wherein the BLER estimate is equal to a filtered number of errors each TTI ($Ne_{13}$ filtered) divided by a filtered number of blocks each TTI ($Nb_{13}$ filtered).

10. The method of claim 1 wherein on a condition that a TrCH meets the predetermined criteria, the TrCH is selected as the reference TrCH.

11. The method of claim 10 wherein the TrCH does not meet the predetermined criteria.

12. The method of claim 1 wherein a current reference TrCH is selected as the reference TrCH.

13. The method of claim 12 wherein on a condition that the current reference TrCH has not received valid data in a discontinuous transmission (DTX) timeout, a TrCH that has recently received data is selected as the reference TrCH.

14. The method of claim 13 wherein a first TrCH that has recently received data and has a better characteristic ranking than a second TrCH that has recently received data is selected as the reference TrCH over the second TrCH.

15. An apparatus for reference transport channel (TrCH) selection, comprising:
    a cyclic redundancy check (CRC) and block error rate (BLER) tracking functional block configured to track CRC and BLER characteristics on each of a plurality of TrCHs;
    a TrCH criteria determination functional block configured to determine whether or not any TrCHs meet a predetermined criteria, wherein the predetermined criteria include a valid data received within a predetermined time period or a minimum number of errors received since a last reference TrCH change; and
    a reference TrCH selection functional block configured to select a reference TrCH based upon the determination of TrCHs that meet the predetermined criteria.

16. The apparatus of claim 15 wherein the predetermined criteria further includes any one of the following criteria: a valid CRC, or an estimated BLER above a target BLER.

17. The apparatus of claim 15 wherein the reference TrCH selection functional block is configured to select a current reference TrCH as the reference TrCH on a condition that no TrCH meets the predetermined criteria.

18. The apparatus of claim 15 wherein, on a condition that no TrCH meets the predetermined criteria, the reference TrCH selection functional block is further configured to select a TrCH that has recently received data as the reference TrCH if the current reference TrCH has not received valid data in a discontinuous transmission (DTX) timeout.

19. The apparatus of claim 18 wherein the reference TrCH selection functional block is further configured to select as the reference TrCH a first TrCH that has recently received data and has a better characteristic ranking than a second TrCH that has recently received data over the second TrCH.

20. The apparatus of claim 15 wherein the reference TrCH selection functional block is configured to select a reference TrCH that has a lowest defined index for that TrCH when a plurality of TrCHs meet the predetermined criteria.

* * * * *